United States Patent [19]

Gregory et al.

[11] Patent Number: 5,189,153
[45] Date of Patent: Feb. 23, 1993

[54] SUBSTITUTED PHTHALOCYANINES

[75] Inventors: Peter Gregory, Bolton; Prakash Patel, Edgerton, both of Great Britain

[73] Assignee: Imperial Chemical Industries, PLC, London, England

[21] Appl. No.: 540,172

[22] Filed: Jun. 19, 1990

[30] Foreign Application Priority Data

Jul. 12, 1989 [GB] United Kingdom ............... 8915961

[51] Int. Cl.$^5$ .................. C09B 47/04; C09B 62/00; C09B 67/00; C07D 487/22
[52] U.S. Cl. ..................... 540/122; 540/123; 540/124; 540/125; 540/127; 540/139; 540/140
[58] Field of Search ............. 540/122, 123, 124, 125, 540/127, 139, 140

[56] References Cited

U.S. PATENT DOCUMENTS 4,824,947  4/1989  Stark ................................. 540/125
4,824,948  4/1989  Stark et al. ........................ 540/125

FOREIGN PATENT DOCUMENTS 0155780  9/1985  European Pat. Off. .
0282182  9/1988  European Pat. Off. .
 982245  4/1961  United Kingdom .

*Primary Examiner*—Nicholas S. Rizzo
*Assistant Examiner*—Matthew V. Grumbling
*Attorney, Agent, or Firm*—Cushman, Darby & Cushman

[57] ABSTRACT

A phthalocyanine compound of the Formula (1):

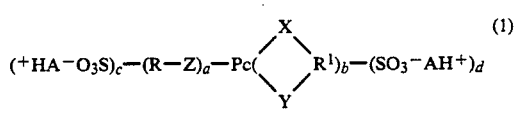

wherein:
Pc is a phthalocyanine nucleus which is metal free or contains a metal or oxymetal;
X is S; NT or O;
Y is S; NT or O;
Z is S or Se; in which T in the above is H; alkyl or aryl;
$^+$HA is an aliphatic polyamino ammonium ion or a substituted diguanidinium ion;
each R independently is an aromatic radical linked to a peripheral carbon atom of the Pc nucleus through an atom Z;
each $R^1$ independently is optionally substituted phenylene or naphthylene in which the atoms X and Y are attached to adjacent nuclear carbon atoms in $R^1$ and to adjacent peripheral carbon atoms of the Pc nucleus;
a is 0 to 16; provided that
b is 0 to 8; a+b>0; and
c+d is 1 to 16.

8 Claims, No Drawings

SUBSTITUTED PHTHALOCYANINES

This specification describes an invention relating to certain insoluble amine salts of substituted phthalocyanine sulphonates which absorb in the near infra-red region of the electro-magnetic spectrum e.g. at 700–1500 nanometers (nm) and especially at 725–1100 nm.

According to the present invention there is provided a phthalocyanine compound of Formula (1):

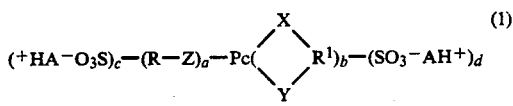

wherein:
Pc is a phthalocyanine nucleus which is metal free or contains a metal or oxymetal;
X is S; NT or O;
is S; NT or O;
Z is S or Se;
in which T in the above is H; alkyl or aryl;
$+HA$ is an aliphatic polyamino ammonium ion or a substituted diguanidinium ion;
each R independently is an aromatic radical linked to a peripheral carbon atom of the Pc nucleus through an atom Z;
each $R^1$ independently is optionally substituted phenylene or naphthylene in which the atoms X and Y are attached to adjacent nuclear carbon atoms in $R^1$ and to adjacent peripheral carbon atoms of the Pc nucleus;
a is 0 to 16;
b is 0 to 8; provided that a+b>0; and
c+d is 1 to 16.

The core of the phthalocyanine nucleus (Pc) may be metal-free or contain any of the metals or oxymetals which are capable of being complexed within the core. Examples of suitable metals and oxymetals include magnesium, aluminium, vanadyl, titanyl, and more especially copper, particularly copper (II), nickel, cobalt, iron, zinc and lead. Where appropriate in this specification a metallised phthalocyanine such as copper (II) phthalocyanine is designated thus, Cu(II)Pc.

The atoms X and Y are attached to adjacent carbon atoms of the phenylene or naphthylene nucleus and to adjacent carbon atoms, i.e. 3,4-, 4,5- or 5,6-positions, of the phthalocyanine nucleus, especially in the 4,5-positions, to form a six membered heterocyclic ring by fusing $R^1$ to the phthalocyanine nucleus, i.e. as in the Formula (2):

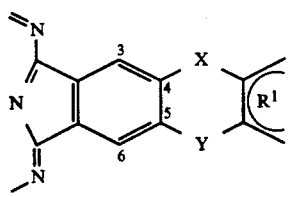

The numbering of the peripheral carbon atoms on the phthalocyanine nucleus as 3, 4, 5 and 6 is by reference to the positions on the phthalic anhydride from which it is derivable (as described in EP 155780A).

The atom Z forms a link between the aromatic nucleus R and the phthalocyanine nucleus. The atom Z may be attached to the 3, 4, 5 or 6-positions of the phthalocyanine nucleus, but when b=4 it is preferred that Z is attached to the 3 or 6-positions.

Each R is preferably an optionally substituted mono- or bi-cyclic aryl or heteroaryl, and is more preferably selected from phenyl, naphthyl, thienyl, thiazolyl, thiadiazolyl, pyridyl, benzoimidazoyl and benzothiazolyl. Each R may carry up to 4 substituents but more preferably 1 or 2 substituents in any free ring position. Preferred substituents are selected from $C_{1-20}$-alkyl, especially $C_{1-4}$-alkyl; $C_{1-20}$-alkoxy, especially $C_{1-4}$-alkoxy; —S—$C_{1-20}$-alkyl, especially —S—$C_{1-4}$-alkyl; aryl, especially phenyl; —S-aryl, especially —S-phenyl; halogen, especially chloro; nitro; cyano; tertiary amino, such as di-N,N-alkyl-, N-alkyl-N-aryl- and di-N,N-arylamino, especially di-($C_{1-4}$-alkyl)amino, N-$C_{1-4}$-alkyl-N-phenylamino and di-(phenyl) amino; —COOH; —$COT^1$; —$CONT^1T^2$; —$SO_2T^1$ and —$SO_2NT^1T^2$ in which $T^1$ and $T^2$ independently are selected from —H; alkyl, especially $C_{1-4}$-alkyl; aryl, especially phenyl and aralkyl, especially benzyl. It is more especially preferred that the substituent on R is a 4-methyl group.

It is preferred that the average value of a is from 6 to 16 and especially from 7 to 9 or 15 to 16.

Each $R^1$ is preferably an optionally substituted phen-1,2-ylene or naphth-3,4-ylene. Preferred substituents are selected from any of those listed above for R.

It is preferred that the average value of b is from 0 to 4.

It is preferred that a+2b is from 1 to 16, more preferably >6, especially preferably from 8 to 16 and more especially preferably from 14 to 16. It is preferred that any remaining peripheral carbon atoms on the phthalocyanine nucleus carry —H; halogen, especially chlorine or bromine; —OH; alkoxy, preferably $C_{1-4}$-alkoxy; or aryloxy, especially phenoxy, groups or a combination of these groups.

It is preferred that X is S or NT and that Y is S or NT. It is especially preferred that X is S and Y is NT. It is preferred that T is —H; $C_{1-4}$-alkyl or phenyl. It is especially preferred that T is H.

The sulphonate groups, —$SO_3^-$, are preferably located on the substituted aromatic groups, R and $R^1$.

It is preferred that the average value of c+d is from 4 to 16, especially from 4 to 12, especially preferably from 8 to 12.

Where the cation, $AH^+$, is an aliphatic polyamino ammonium ion it is preferably derived from an aliphatic polyamino compound (A) such as a poly(alkyleneimine) or a polyaminoalkane in which the alkylene or alkane chain between adjacent amino groups may be straight or branched and contains from 2 to 20, preferably from 2 to 6, carbon atoms. The poly(alkyleneimine) preferably contains from 2 to 1500 alkyleneimine units and the polyaminoalkane preferably contains from 2 to 2500 aminoalkane units. Examples of suitable poly(alkyleneimines) include diethylenetriamine, triethylenetetramine, tetraethylenepentamine, pentaethylenehexamine up to polyalkyleneimines with molecular weights of 100,000. Examples of suitable polyamino alkanes include ethylenediamine, hexamethylenediamine and poly(vinylamines) with molecular weights from 60 to 100,000.

Where $AH^+$ is a diguanidinium ion it is preferably derived from a diguanide of Formula (3) or Formula (4):

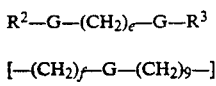
(3)

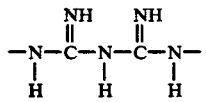
(4)

wherein
G is of the Formula (5):

$$\begin{array}{c} \text{NH} \quad \text{NH} \\ \parallel \quad \parallel \\ -\text{N}-\text{C}-\text{N}-\text{C}-\text{N}- \\ \mid \quad \mid \quad \mid \\ \text{H} \quad \text{H} \quad \text{H} \end{array} \quad (5)$$

$R^2$ and $R^3$ are independently optionally substituted alkyl especially $C_{1-10}$-alkyl; optionally substituted aryl especially phenyl; amino; $C_{1-10}$-alkylamino; di($C_{1-10}$-alkyl)amino or halogen especially chloro;
e is from 3 to 15;
f is from 3 to 15;
g is from 3 to 15; and
h is from 1 to 10.

In the diguanide of Formula (3) it is preferred that optional substituents on $R^2$ and $R^3$ are $C_{1-10}$-alkyl, $C_{1-6}$-alkoxy, amino, $C_{1-6}$-alkylamino, di($C_{1-6}$-alkyl)amino or halogen groups.

It is especially preferred that the optional substituents are $C_{1-4}$-alkyl or halogen groups.

It is most especially preferred that the groups represented by $R^2$ and $R^3$ are, independently, 2-ethylhexyl or 4-chlorophenyl.

It is preferred that e is from 6 to 12 and it is especially preferred that e is 6 or 12.

In the diguanide of Formula (4) it is preferred that f is from 3 to 12 and especially preferred that f is 3, 6 or 12. It is preferred that g is from 3 to 12 and especially preferred that g is 3, 6 or 12. It is preferred that h is from 3 to 8 and especially preferred that h is from 4 to 6.

Examples of suitable diguanides include polyhexamethylene diguanide (hereinafter called PHMD) and chlorhexidine.

Solvent solubility generally decreases with increasing complexity of the cation, $AH^+$. Solubility can be modified both by changing the extent of sulphonation and changing A to suit particular applications. Where relatively low solubility is required it is desirable that the aromatic groups R and $R^1$ have on average at least 3 and up to 12 sulphonate groups per molecule and each sulphonate group is associated with a positively charged nitrogen atom on the cation.

In the compound of Formula (1) only one positive charge is shown on each cation ($AH^+$) to balance the negative charge on the associated sulphonic acid group ($SO_3^-$). However in any of the cations more than one nitrogen atom may carry a positive charge and the positively charged nitrogen atoms in a single cation may be associated with the sulphonate groups on the same or on different phthalocyanine molecules. The resulting clusters of molecules may comprise a plurality of phthalocyanine units associated with each polyamino chain and each phthalocyanine may additionally link together two or more polyamino chains.

Solubility in solvents, such as water; ketones, such as acetone; alcohols, such as ethanol; water/ketone mixtures, such as water/acetone; water/alcohol mixtures, such as water/ethanol; chlorohydrocarbons, such as chloroform; substituted amides, such as dimethylformamide and esters, such as ethyl acetate, is especially low when $^+HA$ is derived from a poly(alkyleneimine) or from a substituted diguanide of Formula (4). Solubility in such solvents is more especially low when $^+HA$ is derived from tetraethylenepentamine or pentaethylenehexamine or from a diguanide of Formula (4) in which f is 3, g is 3 and h is 4 to 6.

Two preferred compounds of Formula (1) are defined below. In both compounds,
Pc is Cu(II)Pc;
R is phenyl or $C_{1-4}$-alkylphenyl especially tolyl;
Z is S;
and $^+HA$ is a cation derived from a poly(alkyleneimine) or a polyaminoalkane or a substituted diguanide;
In the first compound,
a is on average from 15–16;
b is 0;
d is 0;
and c is 12;
and in the second compound,
a is on average from 7–8;
b is 4;
X is S;
Y is NH;
$R^1$ is phenyl;
and c+d is 10.

The compounds of Formula (1) may be prepared by direct sulphonation of unsulphonated analogues of the compounds of Formula (1), in which c=d=0, to produce sulphonated analogues of Formula (1), in which A is H. The conditions for sulphonation in terms of time, temperature and acid strength depend on the number of sulphonate groups required in the molecule. It is possible to introduce up to 15 or 16 sulphonate groups by using up to 10% oleum. The unsulphonated analogues and methods for their preparation are described in EP 155780A and the sulphonated analogues and methods of for their preparation are described in EP 282182A. Addition of a solution of a polyamine or diguanidide (A) to an aqueous, acidic solution of the sulphonated analogue gives a compound of Formula (1) as an insoluble solid which may be isolated by filtration.

Specific examples of analogous sulphonated ir absorbers (SIRA) from which the present insoluble compounds can be prepared are, octa(4-methylphenylthio)-tetra(1-amino-2-thiophen-1,2-ylene)CuPc decasulphonic acid ("SIRA 1"); penta-/hexa-deca(4-methylphenylthio)CuPc decasulphonic acid ("SIRA 2"); octa(4-methylphenylthio)-tetra(1-amino-2-thiophen-1,2-ylene)-CuPc penta-/hexa-sulphonic acid ("SIRA 3").

The present compounds have significant absorption bands in the near infra-red region of the electromagnetic spectrum i.e. from 700 to 1500 nm. The region between 725 and 1100 nm is of particular importance for automatic identification (AI) or machine readability. In addition the present compounds are insoluble in a range of common solvents. The combination of infra-red absorption and insolubility makes these compounds particularly suitable for use in security applications. AI systems use both solid state semi-conductor lasers, which generally emit at 780–830 nm, and infra red light emitting diodes (LEDs), which emit at ca 900 nm, as the radiation source and photodiode detectors based on silicon which have peak sensitivity around 900 nm.

The compounds of Formula (1) in which b=0 generally have fairly narrow absorption bands in the 725–850 nm region whereas compounds of Formula I in which b is >0 generally have a broader absorption band in the 800–950 nm region.

Compounds of Formula (1) in which $b=0$, $a=15$ or 16, R-Z is arylthio, $c=12$ exhibit an intense narrow absorption curve with extinction coefficients typically of the order of $4 \times 10^4$ centred around 760–800 nm and these are compatible with solid state lasers. There is little absorption in the visible region (400–700 nm) so that the compounds are virtually colourless, a very desirable property in security printing applications.

Compounds of Formula (1) in which $b=4$, $a=7$ or 8, particularly those in which X=S, Y=NH, $R^1$ is 1,2-phenylene, Z=S, R is optionally substituted phenyl, $c+d=10$ exhibit a broad absorption band centred at 880–920 nm and extinction coefficients typically around $3.5 \times 10^4$. Such compounds are compatible with both semi-conductor infra red lasers and LEDs.

Uses of the present compounds includes energy absorbers in the flash fusion of toners, security printing, laser thermal printing, ink jet printing, optical data storage, and charge generation materials for laser printers. Printing applications require products with solubility characteristics typical of pigments, that is essentially insoluble in solvents which are conventionally used in printing, such as water, alcohols, ketones, esters, hydrocarbons and chlorinated hydrocarbons. The most commonly used pigment for energy absorption in the infrared is carbon black which gives a black image whereas the present compounds have very low absorptions in the visible region and can be overprinted with a variety of coloured inks. The present aliphatic polyamino ammonium and substituted diguanidinium salts of sulphonated substituted phthalocyanines are substantially insoluble or have very low solubility in many common solvents such as water, water/alcohol, water/ketone mixtures, chlorohydrocarbons, substituted amides and esters.

High extinction coefficients, particularly in compounds where $b=0$, allow production of prints with very high print contrast ratios (PCR) for efficient and accurate reading with automatic identification (AI) equipment. Compounds where $b=0$ are only very faintly coloured, a desirable feature for security applications.

The compounds of Formula (1) exhibit good durability, including high fastness to heat and light. The durability to light, in particular, is considerably greater than for other known classes of infra-red absorbers such as cyanines, triphenylmethanes, complex nickel salts of dithiols, oxathiols and aryliminium and di-iminium compounds.

The present invention is further illustrated by the following examples in which all parts and percentages are by weight unless otherwise indicated.

EXAMPLE 1

Polyethylene imine, molecular weight 50,000–60,000 (8 parts of a 25% solution) was added with stirring to a solution of octa(4-methylphenylthio)-tetra(1-amino-2-thiophen-1,2-ylene)CuPc decasulphonic acid (SIRA 1, 5 parts of 20% solution) in water (20 parts). The mixture was stirred for 15 minutes at ambient temperature before adjusting the pH to 3–4 with phosphoric acid. The precipitated solid was filtered off and dried at 100° C.

EXAMPLE 2

Polyhexamethylene diguanide (PHMD) (7 parts of a 20% solution) was added to a stirred solution of SIRA 1 (4 parts of 20% solution) in water (45 parts). After stirring for 15 minutes, the precipitated solid was filtered off and dried at 100° C.

EXAMPLE 3

Diethylenetriamine (6 parts) was added slowly to a solution of SIRA 1 (3.5 parts) in water 25 parts and the pH adjusted to 3–4 with dropwise addition of $H_3PO_4$ to precipitate the polyamine salt. After stirring for 10 minutes, the product was isolated by filtration and dried at 70° C.

EXAMPLE 4

The procedure of Example 3 was repeated using triethylenetetramine in place of diethylenetriamine.

EXAMPLE 5

The procedure of Example 3 was repeated using tetraethylenepentamine in place of diethylenetriamine.

EXAMPLE 6

The procedure of Example 3 was repeated using pentaethylenehexamine in place of diethylenetriamine.

EXAMPLE 7

The procedure of Example 3 was repeated using chlorhexidine in place of diethylenetriamine.

EXAMPLE 8

The procedure of Example 1 was repeated using penta-/hexadeca-(4-methylphenylthio)CuPc decasulphonic acid (SIRA 2) in place of SIRA 1.

EXAMPLE 9

The procedure of Example 2 was repeated using SIRA 2 in place of SIRA 1.

EXAMPLE 10

The procedure of Example 3 was repeated using diethylenetriamine (4.6 parts) and SIRA 2 (4 parts) in place of SIRA 1.

EXAMPLE 11

The procedure of Example 10 was repeated using triethylenetetramine in place of diethylenetriamine.

EXAMPLE 12

The procedure of Example 10 was repeated using tetraethylenepentamine in place of diethylenetriamine.

EXAMPLE 13

The procedure of Example 10 was repeated using pentaethylenehexamine in place of diethylenetriamine.

EXAMPLE 14

The procedure of Example 10 was repeated using chlorhexidine in place of diethylenetriamine.

EXAMPLE 16

The procedure of Example 10 was repeated using ethylenediamine in place of diethylenetriamine.

EXAMPLE 17

Diethylenetriamine (2 parts) was added slowly to a solution of octa(4-methylphenylthio)-tetra(1-amino-2-thiophen-1,2-ylene)-CuPc penta/hexasulphonic acid (SIRA 3, 0.5 parts) stirring in 50:50 acetone: water (40 parts) and the pH adjusted to 3–4 by the dropwise addition of $H_3PO_4$, to precipitate the polyamine salt. After stirring for 10 minutes, the product was isolated by filtration and dried at 70° C.

EXAMPLE 18

The procedure of Example 17 was repeated using triethylenetetramine in place of diethylenetriamine.

EXAMPLE 19

The procedure of Example 17 was repeated using tetraethylenepentamine in place of diethylenetriamine.

EXAMPLE 20

The procedure of Example 17 was repeated using pentaethylenehexamine in place of diethylenetriamine.

EXAMPLE 21

The procedure of Example 17 was repeated using chlorhexidine in place of diethylenetriamine.

EXAMPLE 22

The procedure of Example 17 was repeated using polyethylene imine (molecular weight 50,000–60,000) in place of diethylenetriamine.

The absorption spectra of the above products were measured in dimethylformamide and $\lambda_{max}$ values are shown in Table 1.

TABLE 1

| Example | λmax/nm |
|---|---|
| 1 | 920 |
| 2 | 894 |
| 5 | 914 |
| 7 | 880 |
| 8 | 797 |
| 9 | 777.6 |
| 11 | 780 |
| 15 | 798 |
| 17 | 878 |
| 18 | 870 |
| 19 | 850 |
| 20 | 899 |
| 21 | 884 |
| 22 | 875 |

EXAMPLES 22–48

Analogous compounds of Formula (1) in which AH+ is a polyaminoammonium ion derived from a polyethylene imine of molecular weight 50,000–60,000 may be prepared by reaction of the polyethylene imine described in Example 1 with each of the phthalocyanine sulphonic acids described in Table 2 in accordance with the method of Example 1, further illustrate the present invention.

EXAMPLES 49–75

Analogous compounds of Formula (1) in which AH+ is a polyaminoammonium ion derived from diethylene triamine may be prepared by reaction of diethylene triamine with each of the phthalocyanine sulphonic acids described in Table 2 in accordance with the method of Example 3, further illustrate the present invention.

EXAMPLES 76–102

Analogous compounds of Formula (1) in which AH+ is a polyaminoammonium ion derived from triethylene tetramine may be prepared by reaction of triethylene tetramine with each of the phthalocyanine sulphonic acids described in Table 2 in accordance with the method of Example 4, further illustrate the present invention.

EXAMPLES 103–129

Analogous compounds of Formula (1) in which AH+ is a polyaminoammonium ion derived from tetraethylene pentamine may be prepared by reaction of tetraethylene pentamine with each of the phthalocyanine sulphonic acids described in Table 2 in accordance with the method of Example 5, further illustrate the present invention.

EXAMPLES 130–156

Analogous compounds of Formula (1) in which AH+ is a polyaminoammonium ion derived from pentaethylene hexamine may be prepared by reaction of pentaethylene hexamine with each of the phthalocyanine sulphonic acids described in Table 2 in accordance with the method of Example 6, further illustrate the present invention.

EXAMPLES 157–183

Analogous compounds of Formula (1) in which AH+ is a diguanidium ion derived from a polymeric diguanide of Formula (4) may be prepared by reaction of the polyhexamethylene biguanide (PHMD) described in Example 2 with each of the phthalocyanine sulphonic acids described in Table 2 in accordance with the method of Example 2, further illustrate the present invention.

EXAMPLES 184–210

Analogous compounds of Formula (1) in which AH+ is a diguanidinium ion derived from chlorohexidine may be prepared by reaction of chlorohexidine with each of the phthalocyanine sulphonic acids described in Table 2 in accordance with the method of Example 7, further illustrate the present invention.

TABLE 2

| X | Y | Z | R | R¹ | a | b | c + d | Metal |
|---|---|---|---|---|---|---|---|---|
| S | S | S | 4-CH₃Phenyl | 4-CH₃phenyl-1,2-ene | 7 | 4 | 11 | — |
| S | N | S | 4-ClPhenyl | phenyl-1,2-ene | 7 | 4 | 10.5 | Cu |
| S | N | S | 4-(CH₃)₂NPhenyl | phenyl-1,2-ene | 7 | 4 | 10 | Cu |
| S | N | S | 4-CH₃OPhenyl | phenyl-1,2-ene | 7 | 4 | 10.5 | Cu |
| S | N | S | naphth-2-yl | phenyl-1,2-ene | 7 | 4 | 14 | Cu |
| S | N | S | thien-2-yl | phenyl-1,2-ene | 7 | 4 | 11.5 | Cu |
| S | N | S | 1-thia-3,4-diazol-2-yl | phenyl-1,2-ene | 7 | 4 | 9.5 | Cu |
| S | N | S | 5-CH₃Obenzimidazol-2-yl | phenyl-1,2-ene | 7 | 4 | 11 | Cu |
| S | N | Se | phenyl | phenyl-1,2-ene | 7 | 4 | 12.5 | Cu |
| — | — | S | 4-n-BuOphenyl | — | 15 | 0 | 12 | Cu |
| — | — | S | 4-CH₃OPhenyl | — | 15 | 0 | 12 | Cu |
| — | — | S | 4-C₈H₁₇OPhenyl | — | 15 | 0 | 10.5 | Cu |
| — | — | S | 4-C₁₂H₂₅OPhenyl | — | 15 | 0 | 10 | Cu |

TABLE 2-continued

| X | Y | Z | R | R¹ | a | b | c + d | Metal |
|---|---|---|---|---|---|---|---|---|
| — | — | S | 4-C$_9$H$_{19}$Phenyl | — | 15 | 0 | 10 | Cu |
| — | — | S | 4-C$_{12}$H$_{25}$Phenyl | — | 15 | 0 | 9.5 | Cu |
| — | — | S | 4-CH$_3$SPhenyl | — | 15 | 0 | 12.5 | Cu |
| — | — | S | naphth-2-yl | — | 15 | 0 | 15 | Cu |
| — | — | S | 4-CH$_3$SPhenyl | — | 16 | 0 | 11 | Fe |
| — | — | S | 4-CH$_3$Phenyl | — | 16 | 0 | 12.5 | Pb |
| — | — | S | 4-CH$_3$Phenyl | — | 16 | 0 | 12 | Mg |
| — | — | S | 4-CH$_3$Phenyl | — | 16 | 0 | 11 | Zn |
| — | — | S | 4-CH$_3$Phenyl | — | 16 | 0 | 11 | Co |
| — | — | S | 4-CH$_3$Phenyl | — | 16 | 0 | 11 | Ni |
| — | — | S | 4-n-BuOPhenyl | — | 16 | 0 | 13 | — |
| — | — | S | 2-COOHPhenyl | — | 16 | 0 | 12 | — |
| — | — | S | benzothiazol-2-yl | — | 16 | 0 | 12 | Zn |
| — | — | S | pyrid-2-yl | — | 16 | 0 | 10 | Ni |

We claim:
1. A phthalocyanine compound of the Formula (1):

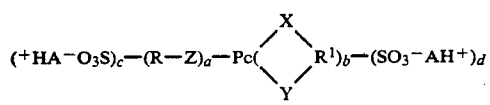

wherein:
Pc is a phthalocyanine nucleus which is metal free or contains a metal or oxymetal;
X is S; NT or O;
Y is S; NT or O;
Z is S or Se;
in which T in the above is H; alkyl or aryl;
$^+$HA is an aliphatic polyamino ammonium ion or a substituted diguanidinium ion;
each R independently is an aromatic radical linked to a peripheral carbon atom of the Pc nucleus through an atom Z;
each R¹ independently is optionally substituted phenylene or naphthylene in which the atoms X and Y are attached to adjacent nuclear carbon atoms in R¹ and to adjacent peripheral carbon atoms of the Pc nucleus;
a is 0 to 16; provided that
b is 0 to 8; a+b 2b is 8 to 16; and
c+d is 4 to 16.

2. A phthalocyanine according to claim 1 wherein the phthalocyanine nucleus, Pc, contains a metal or oxymetal and is selected from Mg, Al, Cu, Ni, Co, Fe, Zn, Pb, vanadyl or titanyl.

3. A phthalocyanine according to claim 1 wherein the metal in the phthalocyanine nucleus, Pc, is Cu(II).

4. A phthalocyanine according to claim 1 wherein A is (i) a poly(alkyleneimine) in which the alkylene chain is straight or branched and comprises from 2 to 20 carbon atoms and comprises from 2 to 1500 alkyleneimine units or (ii) a polyaminoalkane in which the alkane chain between adjacent amino groups is straight or branched and comprises from 2 to 20 carbon atoms or (iii) a diguanidinium ion of Formula (3) or of Formula (4)

$$R^2—G—(CH_2)_e—G—R^3 \quad (3)$$

$$[—(CH_2)_f—G—(CH_2)_g—]_h— \quad (4)$$

wherein G is of the Formula (5):

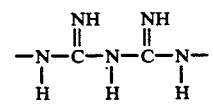

R² and R³ are independently optionally substituted alkyl; optionally substituted aryl; amino; alkylamino; di(alkyl)amino or halogen;
e is from 3 to 15;
f is from 3 to 15;
g is from 3 to 15; and
h is from 1 to 10.

5. A phthalocyanine compound according to claim 1 wherein A is selected from diethylene triamine, triethylene tetramine, tetraethylene pentamine, pentaethylene hexamine, polyalkyleneimine (molecular weight from 50,000 to 60,000), ethylene diamine, hexamethylene diamine, poly(vinylamines) molecular weight from 60 to 100,000, polyhexamethylene diguanide and chlorhexidine.

6. A phthalocyanine compound according to claim 1 wherein R is selected from substituted or unsubstituted phenyl, naphthyl, thienyl, thiazolyl, thiadiazolyl, pyridyl, benzimidazolyl and benzothiazolyl.

7. A phthalocyanine compound according to claim 1 wherein R is selected from phenyl, C$_{1-20}$-alkylphenyl, halophenyl, dialkylaminophenyl, C$_{1-20}$-alkoxyphenyl, carboxyphenyl, C$_{1-20}$-alkylSphenyl.

8. A phthalocyanine compound according to claim 1 wherein R is 4-methylphenyl and R¹ is 1-amino-2-thiophenyl-1,2-ylene, a is 7 or 8, b is 4 and c+d is from 8 to 12.

* * * * *